United States Patent Office 3,208,957
Patented Sept. 28, 1965

3,208,957
POLYOL POLYURETHANE FOAMS WITH TRI-METHYLOLPROPANE BASED HYDROXYL SUPPLYING COMPONENTS
Thomas M. Powanda, Middlesex, and Edward J. Hensch, Fords, N.J., assignors to Celanese Corporation of America, New York, N.Y., a corporation of Delaware
No Drawing. Filed Feb. 1, 1961, Ser. No. 86,321
10 Claims. (Cl. 260—2.5)

In the preparation of polyurethane foams several components are used. One of the components required is a compound containing free isocyanato (—NCO) radicals. This can be a polyisocyanate, usually a diisocyanate, or a reaction product thereof, containing free —NCO radicals. Such a reaction product is sometimes called an adduct or a prepolymer and is usually formed with a polyol. The second component supplies reactive hydroxyl groups, derived either from a polyol or from a hydroxyl-terminated polyester.

In most cases small quantities of water are added to the reaction mixture in order to react with some of the free —NCO groups, forming $CO_2$ in situ. Ureas are frequently formed as intermediates, which react in turn with additional free —NCO groups to yield urethanes or cause crosslinking of the polymers formed in the reaction. In many formulations, catalysts are also present. Auxiliary foamers or blowing agents may be added, such as trichlorofluoromethane.

Many problems are encountered in the preparation of successful and practical formulations. One of the objects of this invention is to produce useful prepolymers from arylene diisocyanates with high functionality having low viscosity and good storage stability characteristics. Whereas diisocyanates can be used in foam formulations, the handling of diisocyanates is hazardous, inconvenient and requires special mixers with exceptional mixing power to obtain proper blending prior to setting the foaming composition as a solid. Prepolymers formed with diol polyols have low functionality, comparatively reduced crosslinking ability and do not produce rigid foams with high compression resistance.

The present invention deals with a prepolymer formed by reaction between an arylene diisocyanate and trimethylolpropane propylene oxide condensation products. These propylene oxide derivatives of trimethylolpropane are polyether triols.

Prepolymers having about 10% to 12% free isocyanate content are usually preferred in the polyurethane foam formulations. It has been found that when such prepolymers are made, e.g. by interreacting tolylene diisocyanate and a trimethylolpropane polyether triol, having an approximate molecular weight of about 400 and a hydroxyl number of about 400, those within the desired range of free —NCO content are too viscous for use and in fact are almost solids. It has also been found that prepolymers made from the same starting materials and having increased free isocyanate content of about 25% to 30%, have satisfactory viscosity characteristics at 25° C. but have free isocyanate content too high to be useful by themselves.

These last mentioned intermediates are, however, suitable in the "quasi" type of foaming system. In the "quasi" type foaming system, a low viscosity prepolymer containing high precentages of free isocyanate is blended with additional hydroxyl bearing material. Prior to blending, water, catalyst and emulsifier are mixed with the hydroxyl containing material. By the use of this technique, the —NCO/—OH ratio and the —NCO/$H_2O$ ratio can be adjusted to whatever final ratio is desired. Ability to regulate these ratios permits the production of foams of various densities.

In order to obtain low viscosity prepolymers, it is particularly advantageous to react the diisocyanate with the polyether triol in two steps: first reacting about one half of the polyether triol with the arylene diisocyanate and then carrying out the reaction with the second half of the polyether triol. This procedure secures the formation of low viscosity prepolymers.

An object of this invention is to form rigid foams with high compressive strength and high heat distortion qualities. This object is achieved, according to this invention, by utilizing blends of trimethylolpropane and polyether triols, described above, as hydroxyl supplying component of the quasi system. It has been found that trimethylolpropane is soluble in the polyether triols and that such blends increase the compressive strength of the foams obtained and also increase the heat distortion temperatures, i.e. improve resistance to distortion by heat. Other objects and advantages will be obvious from the description given below.

The preferred arylene diisocyanate is a tolylene diisocyanate. Two isomers are commercially available, 2,4 tolylene diisocyanate and 2,6 tolylene diisocyanate. Mixtures of the two isomers are also marketed commercially, such as 60% to 80% of 2,4 tolylene diisocyanate and 20% to 40% of 2,6 tolylene diisocyanate. In the examples below an 80/20 mixture grade is used.

The polyether triols are polyoxypropylene derivatives of trimethylolpropane have the general formula:

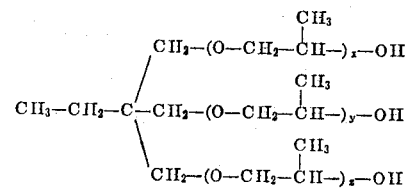

The value $a$ for $x$, $y$ and $z$ are approximately equal in a single product. The physical and chemical constants of two commercially available polyether triols of the above formula are as follows:

| Polyether triol | A | B |
|---|---|---|
| Form | liquid | liquid |
| Molecular weight, about | 411–418 | 730–732 |
| Hydroxyl number | 404–410 | 230±5 |
| Equivalent weight, about | 137 | 241 |
| Percent Hydroxyl | 12.4 | 7.1 |
| Brookfield Viscosity, 25° C. cps | 650 | 325–350 |

The illustrative examples below use the polyether triol "A," which is preferred in the instant application.

Example I illustrates the preferred method of preparation of the prepolymer. It has been found, that this method yields prepolymers with lower viscosities than methods using different reaction conditions, such as method of addition. The two step addition of the polyether triol is of particular advantage. The total formulation in the example below has an —NCO/OH ratio of 4/1.

EXAMPLE I

Reactants: Grams
(A) Polyether triol "A," mol. wt. 411/418 ———————— 636
(E) Tolylene diisocyanate ——— 3230    —NCO/—OH
(C) Polyether triol "A," as       4.0/1.0
    above ———————————————— 636

The procedure for preparing the prepolymer involved the following steps:

(1) Tolylene diisocyanate (B) was charged to the reactor and polyether triol "A" of (A) was added slowly. The reaction was exothermic and the temperature rose to about 60° C.

(2) After all of (A) was added, the temperature was held for one hour at 60° C.

(3) The second portion of polyether triol "A" (C) was added slowly. The reaction was exothermic and the reaction mixture was kept at 90° C. while using external cooling.

(4) The temperature was held at 90° C. for one hour, after all of (C) was added.

(5) The mixture cooled to room temperature and discharged.

Constants of prepolymer:
  Viscosity at 25° C. _____ cps__1760.0
  Percent free isocyanate _____ 25.3 of the Society for the Plastics Industry (Jan. 28, 1957). The heat distortion test on these rigid foams was performed by heating the foams for one hour periods to successively higher temperatures. The foams carried no load. The oven temperature was raised 10° C. every hour and the foams were observed visually for distortion. The testing of a particular foam was stopped at the temperature where distortion was first exhibited. The heat distortion test was carried out only with the respective foam samples of the —NCO/—OH ratio of 1.3 to 1.9. These represented with each of the three hydroxyl supplying components the highest density and highest compression strength.

TABLE I

| Example No. | II | III | IV | V | VI | VII |
|---|---|---|---|---|---|---|
| Materials:[1] | | | | | | |
| —NCO/OH Ratio | 2.0/1.0 | 1.65/1.0 | 1.3/1.0 | 2.0/1.0 | 1.65/1.0 | 1.3/1.0 |
| —NCO/H$_2$O Ratio | 1.0/0.9 | 1.0/0.9 | 1.0/0.9 | 1.0/0.9 | 1.0/0.9 | 10./0.9 |
| Prepolymer of Example I | 156.0 | 184.6 | 189.0 | 176.0 | 217.1 | 233.0 |
| Silicone X-520 | 0.8 | 1.0 | 1.2 | 0.8 | 1.0 | 1.2 |
| Dimethyl Ethanolamine | 2.0 | 2.6 | 3.0 | 2.0 | 2.6 | 3.0 |
| Water | 5.3 | 4.9 | 3.0 | 5.9 | 5.7 | 3.7 |
| Polyether Triol "A" alone | 44.0 | 75.7 | 111.0 | | | |
| Polyether Triol "A" 50% blended with Trimethylolpropane 50% | | | | 24.4 | 43.0 | 67.0 |
| Foam Properties: | | | | | | |
| Density, lbs./cu. ft. | 1.47 | 1.93 | 3.15 | 1.3 | 1.48 | 2.5 |
| Compression (Yield Point) p.s.i. | 20.2 | 22.7 | 55.0 | 21.4 | 32.5 | 60.1 |
| Heat Distortion Temperature, ° C | | | 80 | | | 120 |

[1] Quantities of materials are parts by weight.

In Example I, in the first step a prepolymer with —NCO/—OH ratio of 8/1 was prepared, which then was converted by further addition of polyether triol to a 4/1 ratio end product. This example can be varied by replacing polyether triol "B" for polyether triol "A," while adjusting for the difference in equivalent weight and maintaining in the two steps the —NCO/—OH ratios as given. The —NCO/—OH ratios can also be varied slightly between from about 3.5/1 to about 4.5/1.

*Preparation of foam forming compositions and properties of foams obtained*

Table I and comparative Examples II to VII illustrate the formulation of the foam forming compositions of this invention and the properties of the foams obtained. Examples II to IV illustrate foams made with polyether triol "A" as sole supplier of hydroxyl groups in the "quasi" system employed in Examples II to VII. Examples V to VII illustrate the formulation and properties of foams where the hydroxyl supplying component of the "quasi" system is a blend of 50% polyether triol "A" and 50% trimethylolpropane. It can be seen that Examples II to VII represent two sets of preparations with the respective three hydroxyl supplying components. Within each set the isocyanate-to-hydroxyl ratios were varied from 2/1 to 1.65/1 and 1.3/1. By varying the isocyanate/hydroxyl ratio and employing only 90% of the stoichiometric quantities of water for reaction with the remaining free isocyanate, foams with different densities were obtained. In this manner, the physical properties of foams could be studied over a range of densities.

Examples II to VII all employed the product of Example I as the isocyanate supplying constituent of the "quasi" type foaming system. In the formulations dimethylethanol amine is present as a catalyst. The emulsifying agent is Silicone X-520 which is a water-soluble siloxane polyoxyalkylene block copolymer with a viscosity at 25° C. of 900 centistokes; specific gravity at 25° C. of 1.03; flash point of 505° F.; pour point of —34° F. and coefficient of expansion of $7.8 \times 10^4$ cc./cc. This emulsifying agent is a product of Union Carbide Corporation.

The measurement of Compression (Yield Point) p.s.i., given in Table I was made by the methods set forth in "Tentative Methods of Test for Rigid Cellular Materials"

Examples II to IV are controls, showing the properties of foams made with the polyether triol "A" alone. Examples V to VII illustrate the improvement obtained if a blend of 50/50 of trimethylolpropane and polyether triol "A" is used. To understand the formulations a few additional data will be useful.

Trimethylolpropane has a molecular weight of 134, an equivalent weight of about 45, a hydroxyl number of about 1247, contains 37.8% hydroxyl and it is a solid (not a liquid) at room temperature. The hydroxyl number of the 50/50 trimethylolpropane/polyether triol "A" blend is about 832.

The 50/50 blend of trimethylolpropane/polyether triol "A" increased the heat distortion temperature by 40° C. in the case of Example VII, when compared with Example IV, and exhibited this increase in heat distortion temperature with foam density of 2.5, which is considerably lower than the 3.15 value of the control, i.e. Example IV.

As may be seen from date of Table I, the compressive strength of the foams related to foam density increases substantially over that of the control, when trimethylolpropane is incorporated into the foam composition as part of the hydroxyl supplying component. Lower foam densities with increased compressive strength are obtainable. The 50/50 blend shows the additional advantage of producing at comparative NCO/OH ratios lower foam densities, than the 100% polyether triol "A."

Trimethylolpropane as blend component of the hydroxyl supplying component of the "quasi" polyurethane rigid foam systems improves compressive strength at lower foam densities and increases heat distortion temperatures. It also produces in most instances lower foam densities at comparative NCO/OH ratios.

In the illustrative examples trimethylolpropane percentages up to 50 percent, by weight, of the hydroxyl supplying component of the foam compositions were shown. The percentage of the trimethylolpropane may go as high as 60 percent, by weight, of the blend. The preferred proportion of trimethylolpropane is from about 40 to 60 weight percent.

It is to be understood that the foregoing detailed description is given merely by way of illustration and that many variations may be made therein without departing from the spirit of our invention.

Having described our invention, what we desire to secure by Letters Patent is:

1. A process for producing rigid polyurethane foams with good heat distortion resistance properties and high compressive strength comprising (1) preparing a prepolymer in two steps from an arylene diisocyanate and a polyether triol which is a trimethylolpropane propylene oxide condensation product, said steps consist of reacting said arylene diisocyanate with one half of said polyether triol at a temperature of about 60° C., then reacting the resulting product with the second half of said polyether triol at a temperature of about 90° C., (2) preparing a blend of trimethylolpropane and additional polyether triol, and (3) mixing said prepolymer which is the isocyanate-supplying component with said blend which is the hydroxy-supplying component with water and dimethylethanolamine catalyst.

2. The process of claim 1 wherein said prepolymers, said blend and said water are in such proportions that the —NCO/—OH ratios of the final foams range from about 2.0/1.0 to 1.3/1.0 and the —HCO/$H_2O$ ratio is about 1.0/0.9.

3. The process of claim 1, wherein the arylene diisocyanate is tolylene diisocyanate.

4. The process of claim 1, wherein the blend contains from about 10 percent to about 60 percent of trimethylolpropane and from about 90 percent to about 40 percent of said polyether triol.

5. The process of claim 1, wherein the blend contains about 50 percent trimethylolpropane and about 50 percent of said polyether triol.

6. The process of claim 1, wherein the polyether triol has a molecular weight of about 400, a hydroxyl number of about 400 and an equivalent weight of about 130.

7. The process of claim 1, wherein the prepolymer of the first step has an —NCO/—OH ratio ranging from about 3.5/1.0 to about 4.5/1.0.

8. The process of claim 1, wherein the prepolymer of the first step has an —NCO/—OH ratio of about 4.0/1.0.

9. The process of claim 5 wherein said urethane foams contain from about 176 to 233 parts by weight of said prepolymer, 24 to 67 parts by weight of said blend, 3.7 to 5.9 parts by weight of water and 2.0 to 3.0 parts by weight of said dimethylethanolamine.

10. The process of claim 5 wherein said urethane foams contain about 233 parts by weight of said prepolymer, 67 parts by weight of said blend, 3.7 parts by weight of water and 3.0 parts by weight of said methylethanolamine.

References Cited by the Examiner

UNITED STATES PATENTS

| | | | |
|---|---|---|---|
| 2,866,774 | 12/58 | Price | 260—2.5 |
| 2,949,431 | 8/60 | Britain | 260—2.5 |
| 3,078,239 | 2/63 | Gmitter et al. | 260—2.5 |

OTHER REFERENCES

Barringer: "Rigid Urethane Foams, 11 Chemistry and Formulation" Du Pont Elastomers Chemicals Dept. Bulletin HR–26; April 1958, 56 pages; pages 6–16, 25–27, 38 and 39 relied upon.

LEON J. BERCOVITZ, *Primary Examiner.*

DONALD ARNOLD, *Examiner.*